United States Patent [19]

Nguyen-Tat et al.

[11] 3,869,570

[45] Mar. 4, 1975

[54] SYSTEM FOR ANALYSING TELEGRAPH CHARACTERS

[75] Inventors: Thang Nguyen-Tat, Jouy-en-Josas; Roger André Pain, Vaires; Yann Le Floch, Fontenay-aux-Roses; Jean-Claude Herluison, Argenteuil, all of France

[73] Assignee: International Standard Electric Corporation, New York, N.Y.

[22] Filed: Dec. 11, 1973

[21] Appl. No.: 423,871

[30] Foreign Application Priority Data

Dec. 28, 1972 France .............................. 72.46540

[52] U.S. Cl. ................................................ 178/26 R

[51] Int. Cl. ................................................ H04l 3/00

[58] Field of Search ........... 178/26 R, 26 A, 17.5, 2, 178/3; 340/347 DD

[56] References Cited

UNITED STATES PATENTS

| | | | |
|---|---|---|---|
| 2,997,541 | 8/1961 | Gröttrup | 178/26 A |
| 3,701,856 | 10/1972 | Stuck et al. | 178/26 A |

*Primary Examiner*—Thomas A. Robinson
*Attorney, Agent, or Firm*—John T. O'Halloran; Menotti J. Lombardi, Jr.; Alfred C. Hill

[57] ABSTRACT

An auxiliary translator is added to the main translator of a system for analysing telegraph characters. The auxiliary translator has a number of inputs equal to the number of different telegraph characters of the alphabet employed and a plurality of outputs each providing a binary value made up of a number of binary elements lower than the number of binary elements making up the telegraph character. This arangement reduces the size of the main translator employed in prior art systems to analyse telegraph characters.

4 Claims, 7 Drawing Figures

SYSTEM FOR ANALYSING TELEGRAPH CHARACTERS

BACKGROUND OF THE INVENTION

The present invention relates to a system for analysing telegraph characters received over several lines. This system can be utilized in a telegraph message receiving or switching exchange, in an automatic telegraph exchange or in any other similar installation.

An embodiment of a telegraph message receiving and switching exchange is described in the copending U.S. patent application of T. Nguyen-Tat, R. A. Pain and J. C. Herluison, Ser. No. 423,870, filed Dec. 11, 1973 whose disclosure is incorporated herein by reference. The system of this copending application is illustrated by FIG. 1 and comprises mainly a line block BL, logic circuitry hereinafter referred to as a character block BC, a central processing unit or program block BP and a memory MEM.

The line block is described in U.S. Pat. No. 3,662,095 whose disclosure is incorporated herein by reference. The function of the line block consists in detecting the changes of condition of the characters on the telegraph lines, and to consequently reconstitute the telegraph characters. The line block then stores each of the reconstituted characters in a queue memory or store together with the number of the line along which the character has been received.

The character block takes from the queue store a character as well as the line number. The character block has to determine whether the character taken from the queue store belongs to the body of the message or whether it is one of the so-called "significant characters" belonging, for instance, to the heading or to the end of message sequence. This function is accomplished with the help of a sequential device and a translator. The sequential device is a counter which takes up a determined position every time a significant character is received. The translator receives the incident character as well as the position of the sequential device and provides a new position that the sequential device is to take up and, possibly, a special signal such as "beginning of message" after the sequence ZCZC, or "end of heading", or still "end of message".

The equipment to provide this translator has a special problem. Indeed, the translator must have as many inputs as there are characters for each position of the sequential device. With an alphabet of 64 characters, and, if a sequential device is provided having 64 positions (which is not too excessive for responding to message codes which might include a large number of significant characters) the translator must have 4096 inputs. If such a translator is to be realized in the form of a memory area wherein each cell, addressed by means of the incident character and the present position of the sequential device, contains the new position of the sequential device. In the example chosen, this memory area will comprise 4096 addresses. If it is moreover necessary to consider lines whose messages are not made up in the same way, it would be necessary to provide several translators similar to the one just considered above. Finally, such a solution is very costly and may even be impracticable.

SUMMARY OF THE INVENTION

An object of the present invention is to provide a system for analysing telegraph characters, received over several lines, including a translator which overcomes the above-mentioned problem.

A feature of the present invention is the provision of a system for analysing telegraph characters having a translator and an analysing sequential device wherein each part of a telegraph message other than the intelligence part thereof is associated with a phase of the sequential device and wherein the translator operates on the present phase of the sequential device and a received telegraph character to produce at least a signal representing a new phase for the sequential device, the translator comprising: a main translator to produce the signal; and an auxiliary translator coupled to telegraph lines to receive telegraph messages over each of the lines and to the input of the main translator, the auxiliary translator having a number of inputs equal to the number of different telegraph characters of the alphabet employed and a plurality of outputs each of which provides a predetermined binary value having less binary bits than the number of binary bits forming each of the characters.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
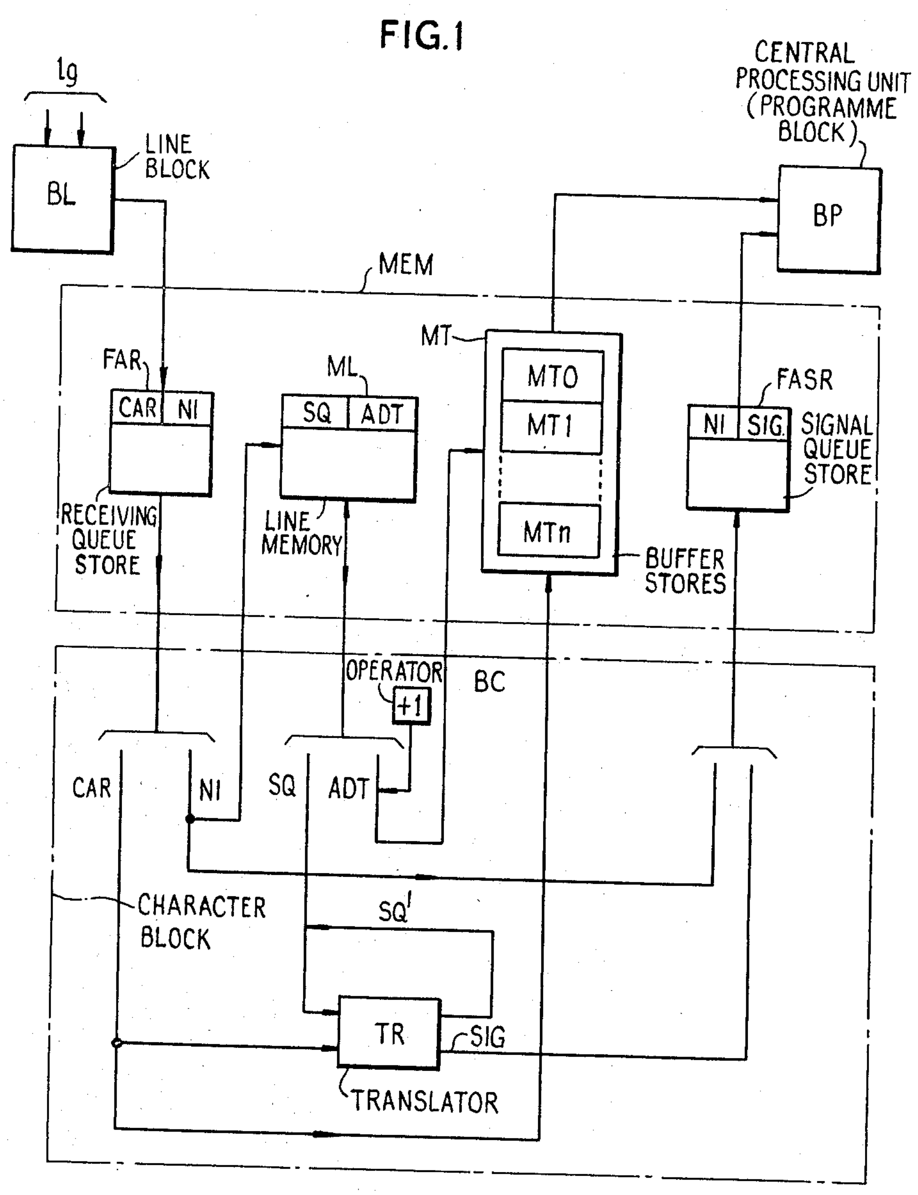
FIG. 1 is a block diagram of an embodiment of a telegraph message receiving and switching exchange incorporating a translator in accordance with the principles of the present invention.

Referring to FIG. 1 there is disclosed an embodiment of a telegraph message receiving and switching exchange incorporating a translator for analysing telegraph characters in accordance with the principles of the present invention.

The essential elements of such an exchange are: a line block BL, a character block BC, a central processing unit or program block BP and a memory MEM. This memory, which can be a ferrite core memory of current known type, comprises a receiving queue store FAR, a line memory ML, and area MT of buffer stores MTO . . . MT*n* and a signal queue store FASR.

The line block BL will proceed sequentially to examine the conditions of the telegraph lines lg. Each change of condition gives rise to a special processing aiming at the reconstitution of a telegraph character. Each reconstituted character CAR, together with the identity NI of the telegraph line over which it has reached block BL, is inserted by block BL into a memory cell of the receiving queue store FAR.

As was mentioned above, a description of an embodiment of line block BL can be found in the U.S. Pat. No. 3,662,095.

The character block BC reads out of the queue store FAR one telegraph character and the identity of the line concerned. It analyses the character thus received in order to detect whether it belongs to a part of a message which does not convey intelligence, such as the heading or the end of message sequence. In this analysis, the character block BC consults the contents of a memory cell in the line memory ML. The address of this cell is deduced from number NI of the line. Into this cell is stored a memory work SQ, the position of the sequential device, and the address ADT of a buffer memory cell.

The character CAR and position SQ of the sequential device are coupled to a translator TR. In response thereto, translator TR provides the new position SQ′ of the sequential device. The character block BC inserts the character into a cell of a buffer store of area MT defined by the address ADT. Moreover, the character block will replace, in the line memory ML at the address designated by NI, the sequential device's former position SQ by the new position SQ′ and, through an operator "+1", character block BC will index the address ADT. If the character CAR is, for instance, the last character of the heading, the translator TR will provide in addition a signal SIG specifying "end of heading". The character block BC will, in this case, insert in the signal queue store FASR a word comprising the signal SIG and the number NI.

The character block BC can now start seizing another character reconstituted by the line block BL.

The program block BP, which can be a stored-program digital computer, starts, when it is available, to read the signals in the signal queue store FASR and switches in a single time the characters provided by each buffer store MT to an appropriate output. Thus, the program block BP no longer has to accomplish repetitive tasks requiring much time, such as the analysing and the routing of characters one by one. These tasks are now performed by a character block BC and results a very appreciable gain in efficiency.

In the above cited copending patent application there will be found a detailed description of the character block BC both as to structure and operation which description is incorporated herein by reference.

Figure 2:
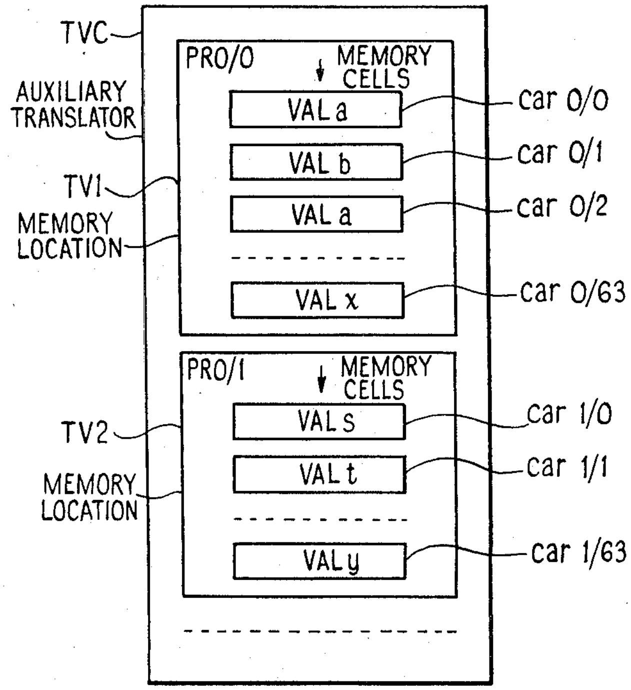
FIG. 2 is a block diagram of the auxiliary translator of the system in accordance with the principles of the present invention.

It was already seen above that in the case of an alphabet of 64 characters and of a sequential device of 64 positions the translator TR, realized in the form of a memory area, had to have 64 × 64 addresses, that is, 4096 addresses, or in other words, translator TR includes 4096 memory cells. Referring to FIG. 2, an embodiment of an auxiliary translator TVC will now be described enabling a reduction in the dimensions of the translator TR in FIG. 1. There will also be described, with reference to FIG. 3, an embodiment of a transistor TRS meant to replace the translator Tr in FIG. 1.

The auxiliary translator TVC in FIG. 2 has the function of replacing each telegraph character CAR by an indication or value made up of a lower number of binary elements than the number of binary elements making up the character. This auxiliary translator TVC is interconnected between the receiving queue store FAR and the translator TR. The translator TVC is in the form of a memory area made up of memory locations such as TV1 and TV2 at the rate of one location per each procedure. A procedure is a well defined mode of composition of messages. According to some procedures, certain characters have a special meaning and generally help to define the various parts of the message. There exist several procedures currently used, but, for a given line, the procedure usd is semi-permanent. Of course, within the scope of the present invention, analysing of characters depends upon the procedure employed. Thus it is that location TV1 which will be used for replacing by a value, as mentioned above, the telegraph characters transmitted along the telegraph lines employing a procedure PRO/0. The other locations, such as location TV2, will be used for the lines employing other procedures.

Location TV1 comprises one memory cell for each different character of the alphabet used. In each memory cell is stored a value VAL*a*, VAL*b* . . . VAL*x*.

To replace a character by the corresponding value, the character block BC will read in the table TVC. The number of the procedure used on the line concerned enables addressing the memory location which suits. In this location, the memory cell to be consulted is determined by the received character.

Thus upon the reception, along a line where procedure PRO/0 is used, of a character of rank 0 in the alphabet used, the character block BC consults the memory cell *car*0/0 of translator TVC. This cell contains the value VAL*a* which will replace the character of rank 0. Likewise, the character of rank 1 will be replaced by the value VAL*b* stored in the memory cell *car*0/1, the character of rank 2 will be replaced by the value VAL*a* stored in the memory cell *car*0/2. Indeed, it is possible to consider that *n* characters, for instance, out of the 64 characters in the alphabet, are significant characters which will be replaced by *n* different values. The remaining 64-*n* characters are in this case current characters and are each replaced by an $(n+1)^{th}$ value, VAL*a*, for instance.

The number of binary elements making up the value to be substituted may vary with the procedure used. Indeed, for procedure PRO/0, for instance, it may be necessary to detect five significant characters. Six different values at least will therefore be used. Three binary elements will be enough for defining them. For procedure PRO/1, 10 significant characters are to be detected, for instance. The substitution value will be defined by four binary elements. In practice, a telegraph character is defined by, at the most, eight binary elements. The value substituted for these characters will include, practically, six binary elements at the most. For homogeneousness sake, all the values will be defined by an 8-it word (byte). Thus, for a given procedure and an alphabet of 64 characters, it is necessary to have 32 memory addresses available when assuming, and this is practically always the case, that the memory word has 16 bits or two bytes.

Now will be described, with reference to FIG. 3, an embodiment of the translator TR of FIG. 1 whose dimensions are reduced due to the utilization of the auxiliary translator TVC of FIG. 2, in conformity with the system of the present invention.

This reduced dimension translator TRS is in the form of a memory zone made up of memory areas such as TR1, at the rate of one area per procedure. Area TR1 comprises one memory cell per each combination, where each combination includes a substitution value and the sequential device position.

Thus, area TR1 is assigned to the procedure PRO/0. It is assumed that in this case the analysis sequential device comprises m+1 positions NPO to NP$m$ and that each of the different characters of the alphabet used is replaced by one of the $z$+1 values VO to V$z$. The number of memory cells of area TR1 is equal to ($m$+1) ($z$+1). In considering again the foregoing chosen examples: for a 64 character alphabet, 10 significant characters for a given procedure, and the analysis sequential device comprises 64 positions, the number of memory cells of area TR1 is equal to 64 × 11 = 704 that is to say 704 addresses instead of 4096. This reduction in the dimensions of translator TR is obtained thanks to the use of the auxiliary translator of FIG. 2 of 32 addresses.

In conclusion, for a given procedure, the gain realized can thus be higher than 3,000 memory addresses.

Now will be described, in referring to FIG. 4, the diagram of an embodiment of a character analysing system in conformity with present invention.

FIG. 4 again illustrates the character block BC as well as the memory MEM of FIG. 1.

Memory MEM comprises the receiving queue store FAR, the line memory ML, the buffer memory area MT and the signal queue store FASR.

Practically, the translators TVC and TRS are realized in the form of an area of the memory MEM. In order to simplify FIG. 4, these two translators are being shown thereon as belonging to the character block BC.

The line memory ML comprises memory areas, such as m10, each assigned to a telegraph line. Each area comprises consecutive memory cells m100 and m101 in which are stored memory words MLE1 and MLE2.

The character block BC comprises an arrangement of memory access circuits CAM, a group of registers RGE, a translation arrangement TRA and an arrangement of control logic circuits CLC.

The memory access circuits CAM comprise: logic circuits, formulating the requests for storing or reading, and, receiving, in exchange, an information indicating that the requested operation is performed. Circuits CAM include an address register A in which is stored the address to be selected in the memory MEM and a memory register M in which is stored the information to be transferred into memory MEM or, into which is being stored the information read from the memory MEM.

When the character block BC has to read an information in the memory MEM, the address is stored in the register A. Then, a bistable PR of the circuits CAM is set. Bistable PR transmits a call signal along a conductor *pr* of an addressing channel *ca* of memory MEM, while the address stored in the register A is transmitted along conductors AD of channel *ca*. Memory MEM performs the requested reading operation and provides an information along conductors ISM of a data channel *cd*. This information is being stored in register M. When the reading operation is terminated, memory MEM provides an end of operation signal along a conductor *fm* of channel *ca*. The bistable PR is then reset, so as to cease the calling of memory MEM.

When the character block BC has to store information in memory MEM, the address is stored in register A, the information to be stored in memory MEM is stored in register M, and bistable PR as well as a bistable IN are set. These two bistables transmit a call signal along conductor *pr* and at the same time a storing order along a conductor *in* of the addressing channel *ca*. The address is coupled along conductors AD of channel *ca* and the information is coupled along conductors IS of channel *cd*. When the storing operation is terminated, the memory MEM provides a signal along conductor fm, which is the same as for the reading operation, to reset bistables PR and IN.

The group of registers RGE comprises four auxiliary registers W, X, Y and Z. They are used for the temporary storing of information read into the memory MEM by the character block BC which, after a specific processing operation, stores them again in that memory.

Figure 3:
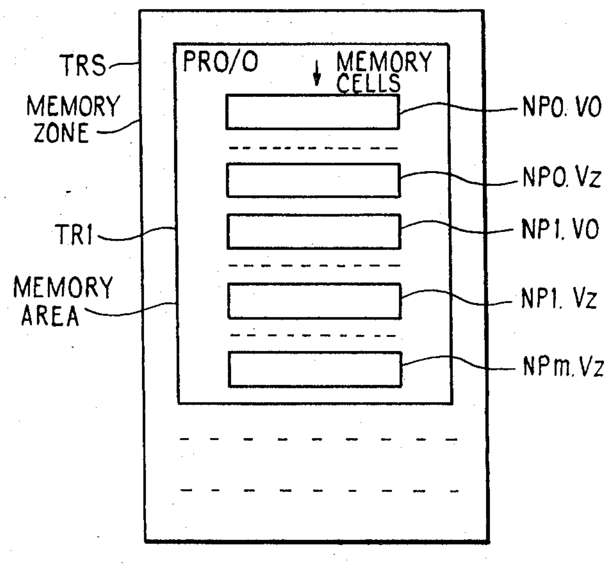
FIG. 3 is a block diagram of translator TR of FIG. 1 realized in conformity with the present invention.

The translation arrangement TRA comprises the translators TVC and TRS of FIGS. 2 and 3. The translator TVC provides, along five conductors V1 to V5, an information VT. This information is made up of 5 bits, of which some only, say 3 for instance, are significant.

The control logic circuit CLC comprise a timing distributor DT and a sequential device SQR.

The timing distributor DT provides a series of time base impulses *t1*, *t2*, *t3*, *t4* and *t5*. The total duration of a series of impulses can be, for instance, 2 microseconds. The generating of the first impulse of a series is, in a general manner, conditioned by the state of progress of the operations in course. The state of progress is symbolized by control *dc*. The other impulses are then generated automatically. The circuits which originate these impulses can be, in currently known fashion, a chain of monostable circuits started each by the trailing edge of the impulse generated by its preceding monostable.

The sequential device SQR is, for instance, a chain of bistables operating one after another in a well established order. To each bistable corresponds a function in the course of which are accomplished well determined operations.

Figure 4:
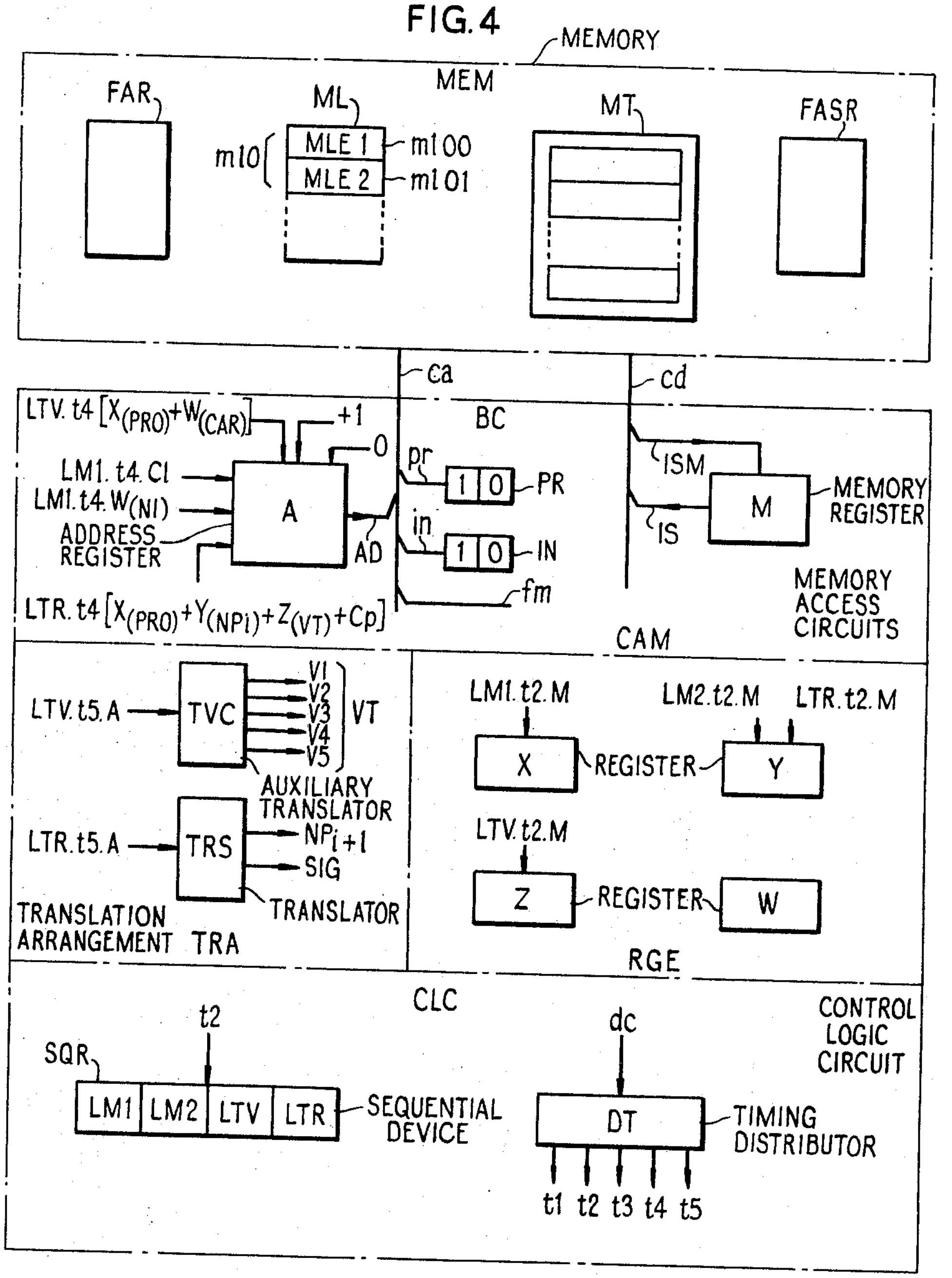
FIG. 4 is a detailed block diagram of a system for analysing characters in conformity with present invention.

In the block diagram of FIG. 4, there are only shown the positions taken by the sequential device SQR when operations of replacement of a telegraph character by a value are being performed. The sequential device SQR always progresses under the operation of an immpulse *t2*.

Figure 6:
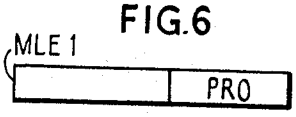
FIGS. 6 and 7 are examples of the memory words used in the system of the present invention.
Figure 7:
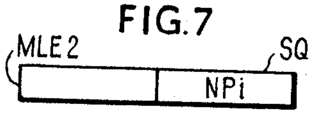

The operation of the character block BC will now be described with reference to FIG. 4, to the operating chart of FIG. 5, and FIGS. 6 and 7 when a telegraph character is having substituted therefor the corresponding value. Each rectangle of the operating chart in FIG. 5 corresponds to a function of the character block BC, characterized by a position of the sequential device SQR. Inside each rectangle, therefore, is found the reference character of one of the sequential device bistables. With each of these rectangles there is associated a table in which are mentioned the operations accomplished during that function. These tables include, from left to right, the reference of the sequential device's position, line numbers, the essential logic conditions determing the performance of the operations, the time at which the operations are performed (time base signal) and the enumeration of the accomplished operations. Each line corresponds to one or several operations performed in the same time. The arrows connecting together the rectangles of the operating chart illustrate the linking up of the various functions.

Figure 5:
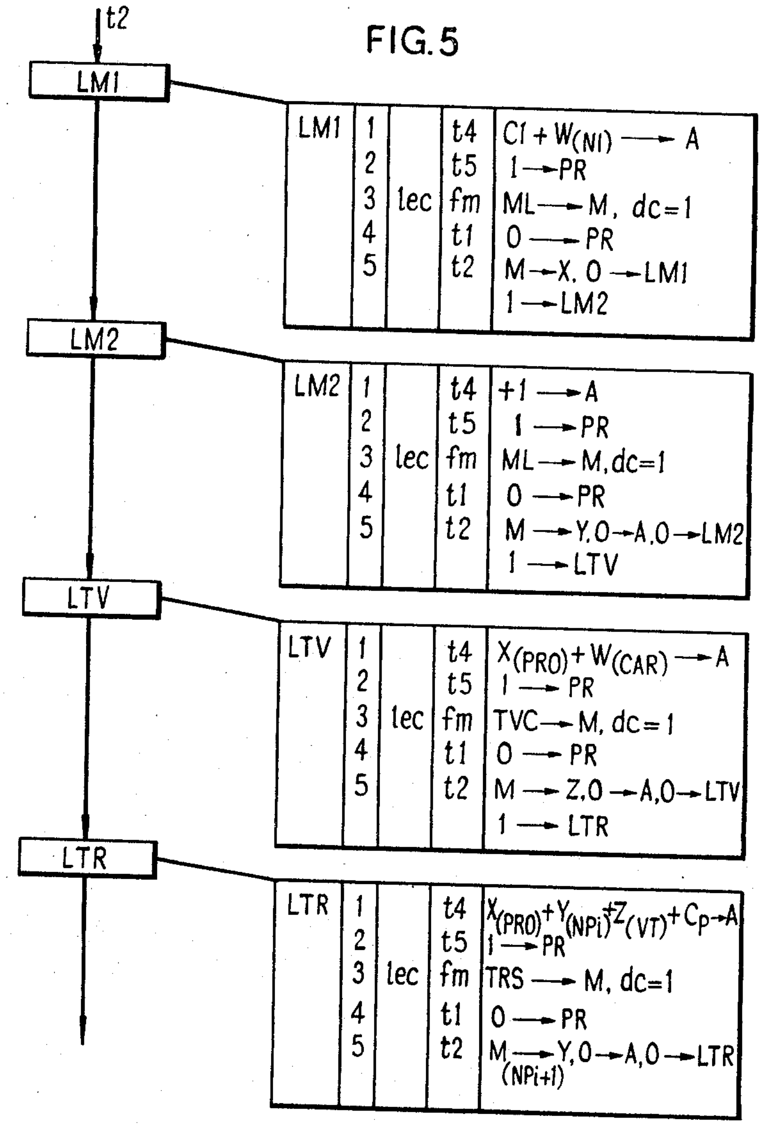
FIG. 5 is an operating chart for the diagram of FIG. 4 and illustrates the detailed operating process of the character block BC in its accomplishment of the function for determining the new phase of the analysing sequential device.

The tables in FIG. 5 correspond to a real detailed schematic diagram. Indeed, they indicate practically all the operations peformed in the block BC of FIG. 4. They therefore enable establishing, without much difficulty: the list of operations in which a considered element intervenes by way of a data transmitter; the list of operations in which a considered element intervenes by way of a data receiver; the list of operators necessary for accomplishing the required operations; the checking of whether all the operations are, on the one hand, current operations in data procesing engineering (loading, unloading, incrementation, etc.) and, on the other hand, whether they are clearly defined (time, transmitter, receiver, type of operation). The lists taken from the tables in FIG. 5 will, therefore, enable by applying simple rules, to provide the detailed schematic of the necessary circuits. It can therefore be stated that the tables in FIG. 5 constitute only a special form of presentation of the detailed logic circuits. This technique of disclosure has been chosen because of the facilities it offers for the description of complex circuits.

Initially, it will be assumed that the character block BC has taken from the queue file FAR a character CAR together with number NI of the line over which it is transmitted. These two items of information were stored in register W. A time base impulse *t2* controls the progressing of sequential device SQR into position LM1.

The detailed operating process of the character block BC will now be described for the operation of substituting for character CAR a value. These operations are controlled by the time base impulses *t1* to *t5* and, for further precision, reference will be made to each of them by mentioning at the same time the position of the sequential device (LM1.*t1*, LM1.*t2*, etc.).

Impulse LM1.*t3* is not used. In a general way, impulse *t3* which is the first one of each operation, simply enables introducing a circuit-preparation delay. It has no active function and will no longer be mentioned subsequently.

Impulse LM1.*t4* (line 1) controls transfer of a constant C1, increased by the line number NI originating from register W, into the register A. This is denoted as C1 +$W_{(NI)}$ → A on the first line in table LM1 of the operating chart in FIG. 5. This operation is also shown in FIG. 4 by the inputs LM1.*t4*.C1 and LM1.*t4*.$W_{(NI)}$ of register A. Constant C1 is the initial address (the first address) of the line memory ML. The addition of the line number defines the address of the first memory cell of the memory area assigned to that line, for instance cell ml00.

Impulse LM1.*t5* (line 2) sets the bistable PR of circuit CAM. Bistable PR then provides a call signal along conductor *pr* of the addressing channel *ca* in the direction of the memory MEM. Absence of any signal along conductor *in* indicates that the character block BC requests a reading. At this very instant, the information stored in register A is coupled along conductors AD of channel *ca* in order to designate the address to be read.

The reading operation is performed, and the read information MLE1 appears on conductos ISM of the data channel *cd*. It is stored in register *M*. The reading operation is denoted *lec*, on line 3 of table LM1 and the transfer of data is denoted ML→ M.

Memory MEM, at the same time as the information is read, provides a signal conductor *fm*. This signal is used for causing a new start of the timing distributor DT (*dc* = 1). In response, the timing distributor DT begins a new cycle and provides, first, an impulse *t1*.

Impulse LM1.*t1* (line 4) resets the bistable PR, and this causes the call of memory MEM to cease.

Impulse LM1.*t2* (line 5) controls the transfer of the information, stored in register M, into the register X, which is shown in FIG. 4 by an input LM1.*t2*.M of register X and is denoted MX in the table LM1 of FIG. 5. It also controls the passing of sequential device SQR onto position LM2 by resetting the bistable LM1 and setting bistable LM2.

Impulse LM2.*t4* (line 1 of table LM2) controls the addition of one unit to the contents of register A (+1 → A). The information stored in that register is, in the example chosen here, the address of the memory cell *m*101 in the line memory ML. In the manner described above, the character block BC reads the word MLE2 stored in that memory cell (ML → M).

Impulse LM2.*t2* (line 5 of table LM2) controls, on the one hand, the transfer of word MLE2 from the register M to the register Y (M → Y) in the table LM2 of FIG. 5 and input LM2.*t2*.M of register Y in FIG. 4) and, on the other hand, the restoring to "0" of register A, and the progressing of sequential device SQR into position LTV.

The word MLE1 (FIG. 6) stored in register X, comprises information PRO. The information PRO defines the procedure used on the telegraph line transmitting the character presently processed.

The word MLE2 (FIG. 7) stored in register Y, comprises the number $NP_i$ of the present position of the message analysing sequential device SQ.

Impulse LTV.*t4* (line 1 in table LTV) controls the transfer of the information PRO of the word MLE1 provided by the register X and of the character CAR, presently stored in the register W, into register A. This operation is denoted $X_{(PRO)} + W_{(CAR)}$ → A in the table LTV and is shown in FIG. 4 by an input LTV.*t4*.($X_{(PRO)}$ + $W_{(CAR)}$ ) of register A. In the manner described above, the character block BC reads the memory cell thus designated, that is to say at the memory cell of translator TVC in which is stored the valve VT which will replace the character. It is pointed out again that for convenience purposes, the translators TVC and TRS practically realized in the form of areas of the memory MEM, are represented in the character block BC. This value VT is being stored in register M, and the "end of reading" signal provided along conductor *fm* is used to cause a new start of the timing distributor DT.

Impulse LTV.*t2* (line 5) controls the transfer of the information contained in the register M, that is to say the value VT, into the register Z (input LTV.*t2*.M of register Z) as well as the restoring to zero of register A. This impulse also controls the progressing of sequential device SQR into position LTR.

Sequential device SQR being in position LTR, the character block BC then begins reading the translator TRS.

Impulse LTR.*t4* controls the storing in register A of the procedure number PRO stored in register X, of the number $NP_i$ of the present position of the message analysing sequential device stored in register Y and of the value VT stored in register Z, as well as of a constant $C_p$ which is the base address of the memory zone assigned to translator TRS. This constant is dependent therefore on the procedure PRO. This constant comprises a variable number of bits dependent on the number of significant bits of value VT. This operation is denoted $X_{(PRO)} + Y_{(NPi)} + Z_{(VT)} + C_P \rightarrow A$ in the table LTR of FIG. 5 and is represented, on the diagram in FIG. 4, by an input LTR.*t*4 ($X_{(PRO)} + Y_{(NPi)} + Z_{(VT)} + C_p$) of register A. The character block BC has access to the memory cell of translator TRS thus designated.

As before, impulse LTR.*t*5 sets bistable PR. The reading operation is being performed, and, the information read, that is, the new phase $NP_{i+1}$ of the message-analysing sequential device and a possible signal SIG, is stored in register M (TRS → M). The end of reading signal transmitted along conductor *fm* is used for causing a new start of the timing distributor DT (*dc* = 1).

Impulse LTR.*t*1 resets bistable PR and the impulse LTR.*t*2 will, on the one hand, control the storing in the cell MLE2 — presently stored in register Y — of the new phase $NP_{i+1}$ stored in register M ($M_{NPi+1)} \rightarrow Y$), and on the other hand, the resetting to 0 of register A and the resetting to 0 of bistable LTR. Sequential device SQR then progresses to the next position and operation of the character block BC proceeds according to the process described in the above cited copending application.

While we have described above the principles of our invention in connection with specific apparatus it is to be clearly understood that this description is made only by way of example and not as a limitation to the scope of our invention as set forth in the objects thereof and in the accompanying claims.

We claim:

1. In a system for analyzing telegraph characters having a translator and an analyzing sequential device wherein each part of a telegraph message other than the intelligence part thereof is associated with a position of said sequential device and wherein said translator operates on the present position of said sequential device and a received telegraph character to produce at least a signal representing a new position for said sequential device, said translator comprising:

a main translator coupled to said sequential device, said main translator responding to said present position of said sequential device to produce said signal; and an auxiliary translator coupled to said sequential device, to telegraph lines to receive telegraph messages over each of said lines and to the input of said main translator, said auxiliary translator having a number of inputs equal to the number of different telegraph characters of the alphabet employed and a plurality of outputs each of which provides a predetermined binary value having less binary bits than the number of binary bits forming each of said characters, said auxiliary translator responding to a position of said sequential device immediately preceding said present position of said sequential device to provide said predetermined binary values.

2. A translator according to claim 1, further including control means having access to said auxiliary translator to provide to said auxiliary translator a received one of said characters and to read from said auxiliary translator a corresponding one of said predetermined binary values which will take place of said received one of said characters in subsequent operations.

3. A translator according to claim 1, wherein said auxiliary translator includes a plurality of memory locations, each of said locations being assigned to a different one of a plurality of modes of composition of said telegraph messages.

4. A translator according to claim 3, wherein each of said lines is associated with at least one of said locations having an indication of the associated one of said plurality of modes of composition of said telegraph messages, and further including means responsive to said indication in order to have access to the associated one of said locations.

* * * * *